US012783900B2

(12) United States Patent
Guo et al.

(10) Patent No.: US 12,783,900 B2
(45) Date of Patent: Nov. 3, 2026

(54) METHODS TO IMPROVE FEDERATED LEARNING ROBUSTNESS IN INTERNET OF VEHICLES

(71) Applicant: Mitsubishi Electric Research Laboratories, Inc., Cambridge, MA (US)

(72) Inventors: Jianlin Guo, Newton, MA (US); Youbang Sun, Boston, MA (US); Kyeong Jin Kim, Lexington, MA (US); Kieran Parsons, Cambridge, MA (US); Stefano Di Cairano, Newton, MA (US); Marcel Menner, Arlington, MA (US); Karl Berntorp, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 854 days.

(21) Appl. No.: 18/176,504

(22) Filed: Mar. 1, 2023

(65) Prior Publication Data

US 2024/0296340 A1 Sep. 5, 2024

(51) Int. Cl.

*G06N 3/098* (2023.01)
*G07C 5/00* (2006.01)
*G08G 1/0967* (2006.01)

(52) U.S. Cl.

CPC ............. *G06N 3/098* (2023.01); *G07C 5/008* (2013.01); *G08G 1/096783* (2013.01)

(58) Field of Classification Search

CPC ... G06N 3/098; G06C 5/008; G08G 1/096783
See application file for complete search history.

(56) References Cited

U.S. PATENT DOCUMENTS

| | | | | |
|---|---|---|---|---|
| 2021/0112441 A1* | 4/2021 | Sabella | ................. | H04W 40/18 |
| 2021/0266284 A1* | 8/2021 | U | ......................... | G06Q 10/109 |
| 2022/0398500 A1* | 12/2022 | Singhal | .................. | G06N 3/098 |

(Continued)

OTHER PUBLICATIONS

Li et al, "Federated Optimization In Heterogeneous Networks", Apr. 2020 (Year: 2020).*

(Continued)

*Primary Examiner* — Michael J Huntley
*Assistant Examiner* — Christopher Dillon Devore
(74) *Attorney, Agent, or Firm* — Gene Vinokur

(57) ABSTRACT

A distributed machine learning based traffic prediction method is provided for predicting traffic of roads. In this case, the distributed machine learning based traffic prediction method includes distributing global multi-task traffic models by a learning server to learning agents to locally train the traffic models, uploading locally trained traffic models by learning agents to the learning server, updating global multi-task traffic models by the learning server using locally trained traffic model parameters acquired from learning agents, generating a time-dependent global traffic map by the learning server using the well trained global multi-task traffic models, distributing the time-dependent global traffic map to vehicles traveling on the roads, and computing an optimal travel route with the least travel time by a vehicle using the time-dependent global traffic map based on a driving plan.

19 Claims, 10 Drawing Sheets

(56) References Cited

U.S. PATENT DOCUMENTS

| | | | | |
|---|---|---|---|---|
| 2023/0063986 | A1* | 3/2023 | Butler | F24F 11/30 |
| 2023/0316090 | A1* | 10/2023 | Chakraborty | G06F 9/54 706/15 |
| 2023/0325427 | A1* | 10/2023 | Budhraja | G06N 20/00 |
| 2023/0385651 | A1* | 11/2023 | Mayyuri | G06N 3/098 |
| 2024/0028938 | A1* | 1/2024 | Berkley | G06N 10/40 |
| 2024/0265296 | A1* | 8/2024 | Gao | G06N 20/00 |

OTHER PUBLICATIONS

Karimireddy et al, "SCAFFOLD: Stochastic Controlled Averaging for Federated Learning", Apr. 2021 (Year: 2021).*
Chen et al, "A Theorem of the Alternative for Personalized Federated Learning", 2021 (Year: 2021).*
Soltani et al, "A Survey on participant Selection for Federated Learning in Mobile Networks", Oct. 2022 (Year: 2022).*
Cho et al, "Client Selection in Federated Learning: Convergence Analysis and Power-of-Choice Selection Strategies", 2020 (Year: 2020).*
Imteaj et al, FedAR: Activity and Resource-Aware Federated Learning Model for Distributed Mobile Robots, 2020 (Year: 2020).*
Zhang et al, "Proportional Fairness in Federated Learning", Jan. 2023 (Year: 2023).*
Li et al. Federated Optimization in Heterogeneous Networks. RXIV:1812. 06127 v 5. Apr. 21, 2020.
Karimireddy et al. SCAFFOLD: Stochastic Controlled Averaging for Federated Learning. aRXIV: 1910.06378V4 cs. lg Apr. 9, 2021.
Deo et al. Multimodal Trajectory Prediction Conditioned on Lane-Graph Traversals. 5th Conference on Robot Learning (CoRL 2021). London, UK.

* cited by examiner

201

Algorithm 1 Variance-Based Federated Learning

Initialize global parameter $x_{global}^{(0)}$, stepsize $\alpha$, moment-estimate parameters $\beta_1, \beta_2$.
for $t = 0, 1, \ldots, T-1$ do
  Central server broadcasts $x_{global}^{(t)}$ to all clients.
  for agent $i \in [n]$ do
    $x_i^{(t,0)} \leftarrow x_{global}^{(t)}$
    moment estimate $m_i^{(0)} \leftarrow 0, v_i^{(0)} \leftarrow 0$
    variance estimate $s_i^{(0)} \leftarrow 0$
    for $k = 0, 1, \ldots, K-1$ do
      $g_i^{(t,k)} \leftarrow \nabla_x l(x_i^{(t,k)}, S_i)$
      $m_i^{(k)} \leftarrow (\beta_1 m_i^{(k-1)} + (1-\beta_1) g_i^{(t,k)})/(1-\beta_1^k)$
      $v_i^{(k)} \leftarrow (\beta_2 v_i^{(k-1)} + (1-\beta_2)(g_i^{(t,k)})^2)/(1-\beta_2^k)$
      $x_i^{(t,k+1)} \leftarrow x_i^{(t,k)} - \alpha m_i^{(k)}/(\sqrt{v_i^{(k)}} + \epsilon)$
      $s_i^{(k+1)} \leftarrow s_i^{(k)} + \|g_i^{(t,k)} - m_i^{(k)}\|^2$
    end for
    if $i \in C_t$ then
      Client $i$ sends local variable $x_i^{(t,K)}$ and variance estimate $s_i^{(K)}$ to server
    end if
  end for
  $x_{global}^{(t+1)} \leftarrow \sum_{i \in C_t} \frac{N_i/s_i^{(K)}}{\sum_{j \in C_t} N_j/s_j^{(K)}} x_i^{(t,K)}$
end for

FIG. 7

Algorithm 2 Structure-Aware Federated Learning

```
Initialize network model 𝓜 with parameter set x = {[x]_1, ...}, classified by S_Het and S_Hom.
for t = 0, 1, ..., T − 1 do
    Central server broadcasts x_global^(t) to all clients.
    for agent i ∈ [n] do
        x_i^(t,0) ← x_global^(t)
        for k = 0, 1, ..., K − 1 do
            for [x_i^(t,k)]_j ∈ S_Het do
                [x_i^(t,k)]_j ← HetUpdate([x_i^(t,k)]_j)
            end for
            for [x_i^(t,k)]_j ∈ S_Hom do
                [x_i^(t,k)]_j ← HomUpdate([x_i^(t,k)]_j)
            end for
        end for
        if i ∈ C_t then
            Client i sends local parameters to server
        end if
    end for
    Server performs global aggregation.
end for
```

FIG. 8

METHODS TO IMPROVE FEDERATED LEARNING ROBUSTNESS IN INTERNET OF VEHICLES

FIELD OF THE INVENTION

The invention relates generally to distribute machine learning for vehicular traffic systems, and more particularly to methods and apparatus of the federated learning in vehicular networks.

BACKGROUND OF THE INVENTION

Modern vehicles are packed with various on-board sensors to accomplish higher automation levels. Different from conventional vehicles, the modern vehicles are much more intelligent. They are not only capable of collecting various vehicle data and traffic data but also capable of running advanced machine learning algorithms to guide their motion.

However, realizing intelligent traffic is an extremely difficult problem. Physical roads form a complex road network. Most importantly, traffic conditions such as congestion at one location can propagate to and impact on traffic conditions at other locations. Furthermore, the unexpected events such as traffic accident and driver behave can make the traffic condition even more dynamic and uncertain. All these factors can impact individual vehicle motion. Therefore, how to accurately predict vehicle parameters such as velocity and trajectory and apply the prediction to optimize vehicle operation is very challenging.

Data-driven machine learning techniques have become inevitable solutions to learn and analyze vehicular data. However, applying machine learning to vehicular applications still faces challenges due to unique characteristics of vehicular networks including high mobility, data privacy, communication cost, high safety requirement, etc.

Although a vehicle can independently train machine learning models by using its own data, data collected by an individual vehicle may contain imperfection, which may lead to non-robust models, whose prediction accuracy may not be robust for the high accuracy demanding vehicular applications or may even result in wrong decision making. Therefore, the non-robust machine learning model trained based on imperfected data may not be acceptable in vehicular applications. In addition, data collected by an individual vehicle may not be sufficient to train the large-scale machine learning models that can be used by the vehicle on the road. For example, a vehicle cannot train a machine learning model that can be applied at locations where the vehicle has not traveled. Therefore, training machine learning models independently by an individual vehicle is not a practical solution.

However, uploading data collected by vehicles to the central server for centralized machine learning model training is impractical either due to enormous communication bandwidth requirement and most importantly, the extensive threat of sharing private information. In addition, different vehicles are equipped with different sensors based on their making, model, size, weight, age and computation resources. Therefore, data collected by different vehicles can be highly heterogenous. As a result, the central server may not have capability to process such heterogenous data. For example, a high-end GPS receiver provides more accurate measurement than a low-end GPS receiver does. For same GPS receiver, its accuracy is higher in open area than in urban area.

The recent advances of privacy-preserving federated learning (FL) can provide a promising solution. The FL is a distributed machine learning technique that allows machine learning models to be trained locally based on the trainer's local data. Therefore, it ensures data privacy protection and also addresses communication cost issue due with zero raw data transfer. Most importantly, the FL incorporates data features from collaborative datasets, which allows robust machine learning model training by eliminating data imperfection contained in an individual dataset. The pre-trained robust models can be distributed to the distributed devices such as on-road vehicles for their prediction tasks.

The FL aims to address two key challenges that differentiate it from traditional machine learning: (1) the significant variability in terms of the characteristics on each vehicle in the network (device heterogeneity) and (2) the non-identically distributed data across the network (statistical heterogeneity).

The FL can be divided into the vanilla FedAvg algorithms and the enhanced FL algorithms such as FedProx and SCAFFOLD. FedAvg is an iterative learning method. At each iteration, FedAvg first locally performs E epochs of model training on K distributed devices. The devices then communicate their model updates to a central server, where the locally trained models are averaged. While FedAvg has demonstrated empirical success in homogeneous settings, it does not fully address the underlying challenges associated with heterogeneity. In the context of device heterogeneity, FedAvg does not allow participating devices to perform variable amounts of local iterations based on their underlying systems constraints; instead it is common to simply drop devices that fail to complete E epochs within a specified time window. From a statistical perspective, FedAvg has been shown to diverge empirically in settings where the data is non-identically distributed across devices. Therefore, the enhanced FL algorithms such as FedProx and SCAFFOLD have been proposed. FedProx is a federated optimization algorithm that addresses the challenges of heterogeneity. It adds an additional regularization term into local objective function to take heterogeneity into account. FedProx allows participating devices to perform different iterations of model training. FedProx demonstrates better convergence rate than vanilla FedAvg on non-identically distributed datasets. The SCAFFOLD is also proposed to improve convergence rate of federated learning. Instead of adding an additional term into objective function, SCAFFOLD uses control variates to correct for the client-drift in local updates. SCAFFOLD requires significantly fewer communication rounds and is not affected by data heterogeneity or client sampling. Furthermore, SCAFFOLD can take advantage of similarity in the client's data yielding even faster convergence.

While the FL can indeed bring manifold benefits, applying FL to vehicular networks still needs to address many issues. For example, how to aggregate locally trained machine learning models to achieve robust vehicle trajectory prediction? Although the existing FL algorithms such as FedProx and SCAFFOLD train machine learning models by considering device and data heterogeneity, the model aggregation in FedProx still applies vanilla FedAvg approach, i.e., simply averages the locally trained models to get global model, and the model aggregation in SCAFFOLD uses data size based average. As a result, FedProx model aggregation does not consider data at all. Even SCAFFOLD model aggregation considers data size, the method does not fully explore the features of non-identically datasets. Take two datasets case as an example, assume dataset 1 contains more data samples collected at middle night and dataset 2 contains less data samples collected at morning rush hour. In this case, to train a morning rush hour traffic model, dataset 2 is clearly more important than dataset 1. However, the data size based model aggregation gives more weight to dataset 1 and therefore, does not make correct decision. The prediction accuracy is the key of machine learning model. Even FedProx and SCAFFOLD show the faster convergence rate, they do not guarantee prediction accuracy. Therefore, to obtain the robust FL models, new algorithms for both the learning server and learning agents, the distributed devices that are selected to train machine learning models, are required.

Accordingly, there is a need to provide a robust federated learning framework, in which both learning server and learning agents are provided with the required algorithms to train robust machine learning models for vehicular tasks such as trajectory prediction, and apply the trained models to the on-road vehicles for their operation optimization, especially with the rising demand on higher automation.

SUMMARY OF THE INVENTION

Some embodiments are based on the recognition that modern vehicles are equipped with various sensors to collect data to improve vehicle operation. On the one hand, due to facts such as communication bandwidth limitation, data privacy protection and security, it is impractical to transfer raw data from all vehicles to the central server for centralized data processing and analysis. On the other hand, the limited amount of data collected by an individual vehicle is not sufficient to train robust and large-scale machine learning models in a city or a state, e.g., a vehicle does not know the traffic conditions at the locations the vehicle has not yet travelled. In addition, the data collected by an individual vehicle may contain imperfection that may lead to non-robust model training. Therefore, it is necessary to provide a collaborative machine learning method by avoiding raw data transfer and ensuring data privacy.

To that end, some embodiments of the invention provide vehicular federated learning methods to train robust machine learning models for accurate motion prediction, wherein a centralized learning server such as a 5G base station (BS) coordinates the federated learning model training, and distributes the well-trained machine learning models to the on-road vehicles for their prediction tasks.

It is one object of some embodiments to provide robust vehicular federated learning methods for both learning server and learning agents by considering data heterogeneity, vehicle heterogeneity and communication resource heterogeneity. Additionally, it is another object of some embodiments to provide the accurate vehicle trajectory prediction to optimize vehicle operation.

Some embodiments are based on the recognition that unlike conventional vehicular traffic metrics that describes general traffic information such as traffic flow, traffic density and average traffic speed, the vehicle trajectory describes individual vehicle motion. To realize optimal vehicle operation, the prediction of vehicle trajectory is critical, especially for automated and autonomous driving.

Some embodiments are based on the recognition that federated learning is a multi-round machine learning model training process. However, due to the high mobility, the time a vehicle connects to a connection point, e.g., a 3GPP C-V2X gNodeB or an IEEE DSRC/WAVE roadside unit, can be short. In other words, it is possible that a vehicle may not have time to complete the whole model training process. In addition, due to data heterogeneity, some vehicles may train machine learning models for more iterations and others may train machine learning models for fewer iterations. Therefore, the learning server must consider local model heterogeneity in model aggregation.

Accordingly, some embodiments of the invention apply generalization error, defined as the difference between ground truth and federated learning prediction, as a metric to measure the federated learning algorithm accuracy.

To that end, some embodiments of the invention provide a variance-based model aggregation method for the learning server by applying an optimal weight simplex to aggregate local models. The weight simplex provides a weight for each local model. The weight is computed using local data variance instead of conventional data size. An optimal weight simplex solution is provided to minimize the generalization error, and therefore, maximize the model accuracy.

Some embodiments are based on the recognition that a federated learning process takes multiple model parameters such as number of local training iterations and local training time window. These model parameters can be classified into two categories: homogeneous parameters and heterogeneous parameters. The homogeneous parameters describe common features for all tasks. For example, road map is a common parameter for tasks such as trajectory prediction, velocity prediction and travel time prediction. However, heterogeneous parameters describe specific features for specific tasks. For example, vehicle route is specific parameter to tasks such as trajectory prediction, velocity prediction and travel time prediction.

To that end, some embodiments of the invention adopt a three-module structure into federated learning framework, in which federated learning framework consists of three interacting modules each with unique purposes. Firstly, a graph encoder module encodes map and vehicle information as a directed graph, then a policy header module learns a discrete policy, the sampled path is decoded into predicted trajectory by a trajectory decoder module.

Accordingly, some embodiments of the invention provide a structure-aware model update method for learning agents to maximize the advantages and minimize the disadvantages of heterogeneous updates. At the start of the learning, the model parameters are divided into homogeneous set and heterogeneous set. After each global learning round, each learning agent performs homogeneous update using FedAvg algorithm on homogeneous set and performs heterogeneous update using algorithm such as FedProx on heterogeneous set.

Some embodiments are based on the recognition that data collected by vehicles depend on location, time, weather, road condition, special event, etc. At same location, traffic condition varies based on different time, different weather, etc. Rush hour traffic condition is different from off hour traffic condition. Snow day traffic condition is different from sunny day traffic condition.

To that end, it is desirable that the selected vehicle agents divide their data into different clusters based on collection location, time, weather, etc. As a result, vehicle agents train different machine learning models by using different data clusters. Vehicle agents do not train models for which they do not have appropriate data. Therefore, vehicle agents only upload trained models to the learning server.

Accordingly, the learning server build global models by aggregating the locally trained models by considering information including location, time, weather, etc.

Some embodiments are based on the recognition that the data size, computation resources and the time vehicle agents receive global model are different. Therefore, the learning server does not require vehicle agents to perform model training with same requirements.

To that end, some embodiments of the invention allow the learning server to take partially trained local models such that some vehicle agents may train model with more iterations and other vehicle agents train models with less iterations.

Some embodiments are based on the recognition that there are uncertainties in vehicular environment. Therefore, federated learning models must be trained to handle unexpected events such as traffic accident captured by the on-road vehicles.

According to some embodiments of the present invention, a learning server is provided for training a global machine learning model using vehicle agents via roadside units (RSUs) in a network. The learning server includes at least one processor; and a memory having instructions of a vehicular federated learning method stored thereon that cause the at least one processor to perform: selecting the vehicle agents from on-road vehicles driving on roads associated with a road map with respect to the global machine learning model; distributing the global machine learning model to the selected vehicle agents via the RSUs, wherein the RSUs are associated respectively with the vehicle agents, wherein the vehicle agents include on-board computer units and on-board sensors configured to collect local data while the vehicle agents drive on current trajectories of the roads, wherein the selected vehicle agents locally train the global machine learning model using the on-board computer units and the collected local data via a structure-aware model training method, wherein the locally trained models are stored as trained local models; aggregating the trained local models from the selected vehicle agents via a variance-based model aggregation method; and updating the global machine learning model using the aggregated trained local models, wherein the at least one processor continues the selecting, the distributing, the aggregating and the updating until a global training round reaches a pre-determined number of multi-rounds or learning error stabilizes.

Further another embodiment provides a computer-implemented method for training a global machine learning model using a learning server and vehicle agents via roadside units (RSUs) in a network. The method includes steps of selecting vehicle agents from on-road vehicles driving on roads associated with a road map with respect to the global machine learning model; distributing the global machine learning model to the selected vehicle agents via the RSUs, wherein the vehicle agents include on-board computer units and on-board sensors configured to collect local data while the vehicle agents drive on current trajectories of the roads, wherein the selected vehicle agents locally train the global machine learning model using the on-board computer units and the collected local data via a structure-aware model training method, wherein the locally trained models are stored as trained local models; aggregating the trained local models from the selected vehicle agents via a variance-based model aggregation method; and updating the global machine learning model using the aggregated trained local models, wherein the at least one processor continues the selecting, the distributing, the aggregating and the updating until a global training round reaches a pre-determined number of multi-rounds or learning error stabilizes.

Accordingly, the learning server and vehicles can interact with each other for model enhancement.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 7 shows a variance-based model aggregation method for learning server in vehicular federated learning framework, according to some embodiments of the present invention;

FIG. 8 shows a structure-aware model parameter update method for learning agents in vehicular federated learning framework, according to some embodiments of the present invention.

DETAILED DESCRIPTION OF THE PREFERRED EMBODIMENTS

Figure 1:
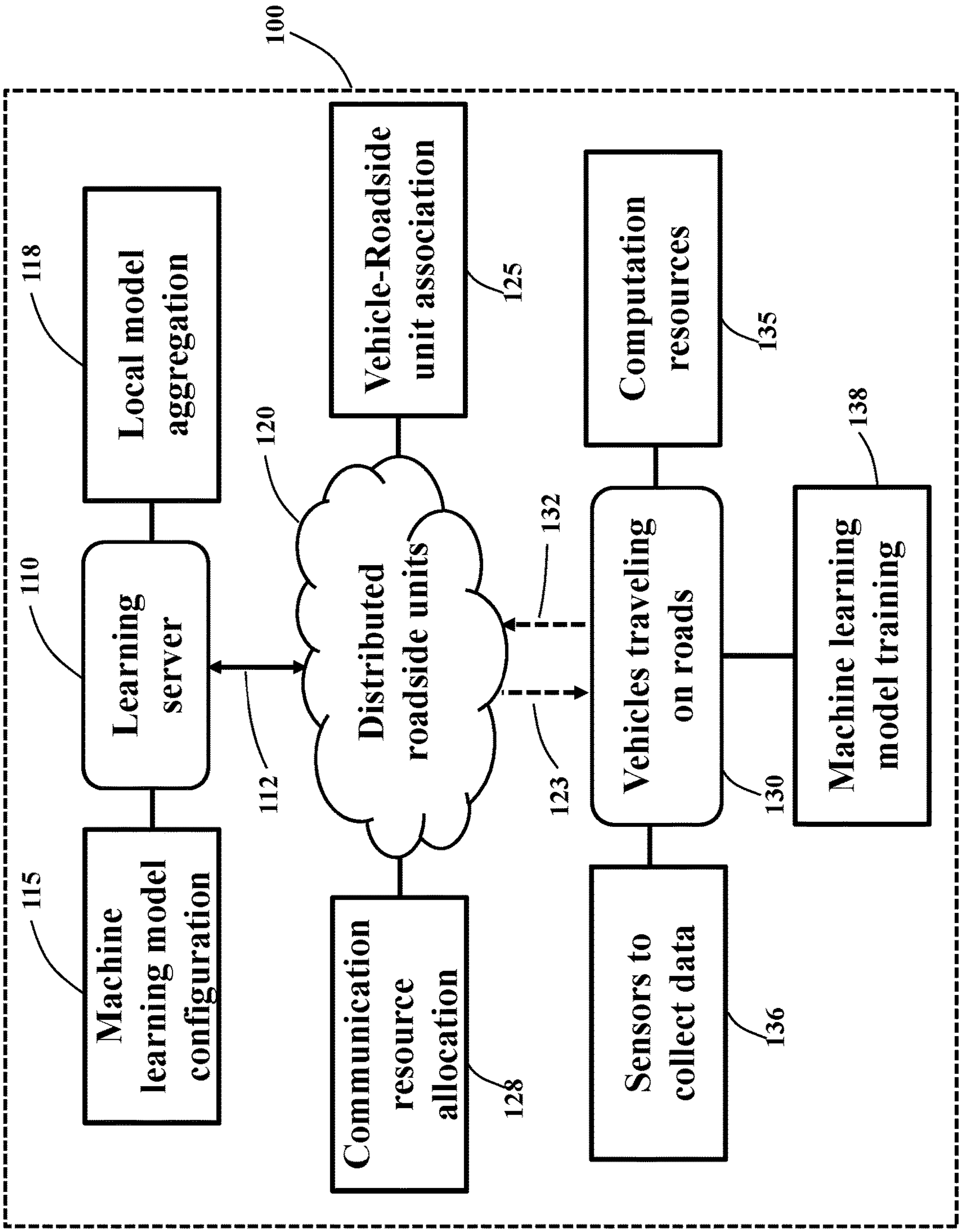
FIG. 1 shows the components of federated learning framework in the Internet of Vehicles, according to some embodiments of the present invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

To facilitate the development of automated and autonomous vehicles, it is imperative to have an accurate motion prediction. This is due to the fact that, such knowledge can help drivers make effective travel decisions so as to mitigate the traffic congestion, increase the fuel efficiency, and alleviate the air pollution. These promising benefits enable the motion prediction to play major roles in the advanced driver-assistance system (ADAS), the advanced traffic management system, and the commercial vehicle operation that the intelligent transportation system (ITS) targets to achieve.

To reap all the aforementioned benefits, the motion prediction must process the real-time and historical vehicle data and observations collected by vehicles. For example, the on-board global position system enables the mobility data to be used for motion prediction. Such emerging big data can substantially augment the data availability in terms of the coverage and fidelity and significantly boost the data-driven motion prediction.

The prior art on the traffic prediction can be mainly grouped into two categories. The first category focus on using parametric approaches, such as autoregressive integrated moving average (ARIMA) model and Kalman filtering model. When dealing with the traffic only presenting regular variations, e.g., recurrent traffic congestion occurred in morning and evening rush hour, the parametric approaches can achieve promising prediction results. However, due to the stochastic and nonlinear nature of the road traffic, the traffic predictions of using the parametric approaches can deviate from the actual values especially in the abrupt traffic. Hence, instead of fitting the traffic data into a mathematical model as done by the parametric approach, an alternative way is to use the data-driven machine learning (ML) based method. For example, a stacked autoencoder model can be used to learn the generic traffic flow features for the predictions. The long short-term memory (LSTM) recurrent neural network (RNN) can be used to predict the traffic flow, speed and occupancy, based on the data collected by the data collectors. Along with the use of RNN, the convolution neural network (CNN) can also be utilized to capture the latent traffic evolution patterns within the underlying road network.

Although the prior arts focus on using advanced deep learning models for the traffic prediction, all of them study the traffic variations with an independent learning model that is not able to capture large scale observations. In reality, due to the varying weather, changing road conditions and special events, the traffic patterns on the road can vary significantly under different situations. Hence, using an independent model is not able to capture such diverse and complex traffic situations. Moreover, due to the limited on-board processor power and on-chip memory at vehicle, the local training data can be extremely insufficient, and a promising prediction performance cannot be achieved. Most important, the data collected by individual vehicle may contain imperfection, which may lead to non-robust model training. On the other hand, the collected data can contain the personal information. In this case, transferring the data to a centralized server can raise the privacy concerns. Meanwhile, the communication cost is another major concern. Therefore, it is necessary to provide a collaborative machine learning architecture by avoiding data transfer, considering communication capability, integrating on-board computation resource and local data heterogeneity.

FIG. 1 shows the components of federated learning framework 100 in the Internet of Vehicles. The framework 100 includes the learning server 110, distributed roadside units 120, and on-road vehicles 130 that are the potential learning agents. The learning server 110 is connected to the distributed roadside units 120 via high speed reliable communication links 112. The learning server 110 can be located remotely or along roadside. The learning server 110 configures machine learning models 115 named (stored in the memory) as global models and aggregate the locally trained models 118. Learning server 110 distribute the global models to the selected on-road vehicles for training. The distributed roadside units (RSUs) 120 form core communication networks, associate (connect) on-road vehicles 125 for service providing and allocate communication resources 128 to the vehicles for model transmission. Most importantly, RSUs relay communication traffic between learning server and vehicles. On-road vehicles 130 use their sensors to collect data 136, train machine learning models 138 using their computation resources 135 and local data (local dataset), and upload locally trained models to the learning servers to build global models. Learning server 110 distribute the well-trained machine learning models to all on-road vehicles 130 via the distributed RSUs 120 for their prediction tasks such as velocity prediction and vehicle-specific power prediction. In this case, the on-road vehicles 130 and the distributed RSUs 120 communicate wirelessly using downlink communication links 123 and uplink communication links 132.

Figure 2A:
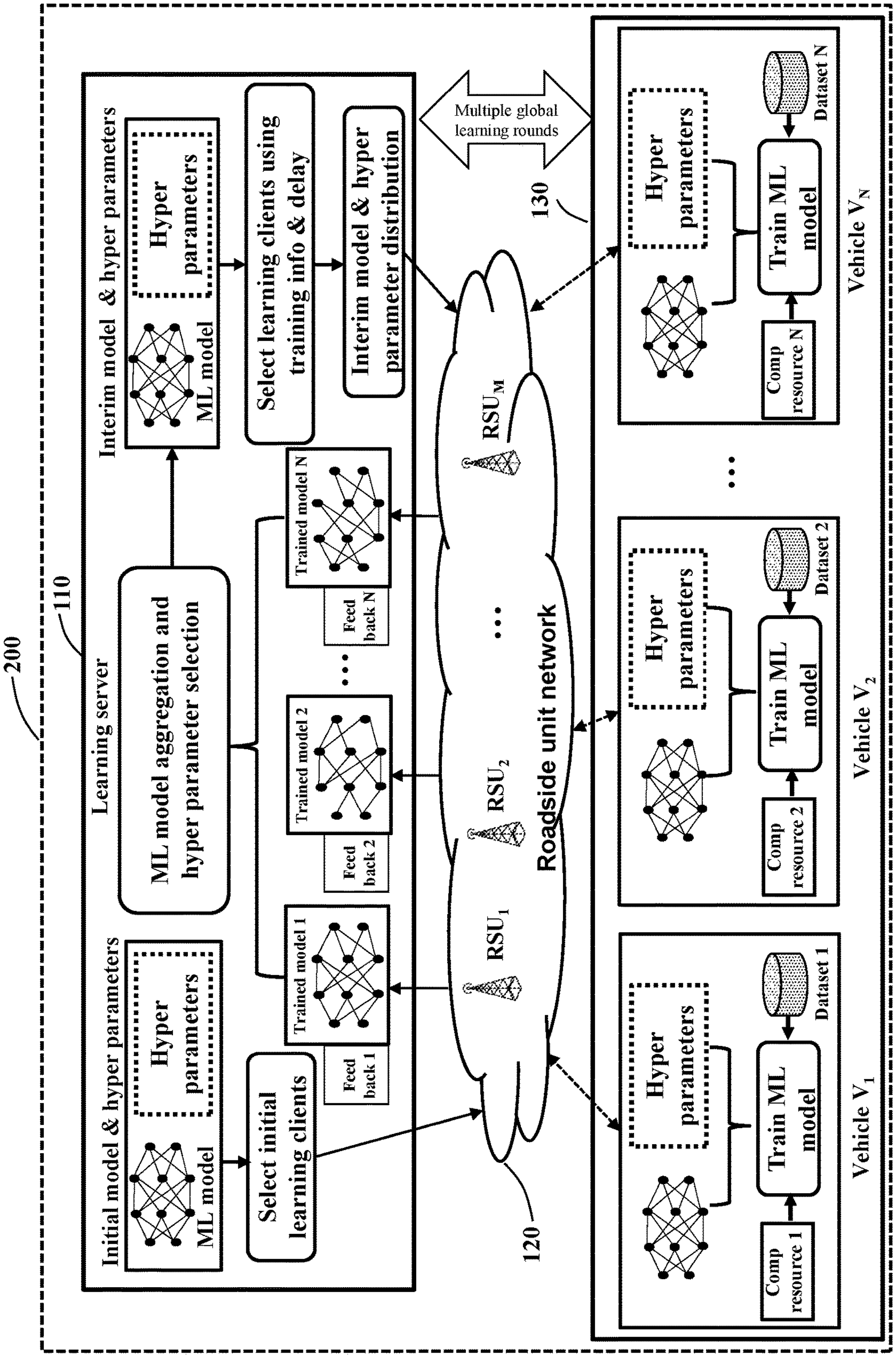
FIG. 2A illustrates the vehicular federated learning architecture for vehicular task prediction, according to some embodiments of the present invention.

FIG. 2A illustrates the two-tier vehicular federated learning architecture 200 for vehicular task prediction, where the learning server 110 selects initial machine learning models such as neural networks and hypermeters such as time threshold to finish local training and time threshold to upload locally trained models, selects initial learning agents to train the models and distributes machine learning models and hyperparameters via RSUs 120 to selected vehicle agents 130 for training. At the start of each training round, the server distributes models and hyperparameters to learning agents for model training. At the end of each training round, the learning server receives locally trained models and feedback such as number of local training iteration and communication link quality from the learning agents. The learning server then aggregates the received local models using method such as averaging and selects hyperparameters for next round of training. The learning server then selects learning agents and distributes the interim models and hyperparameters to the agents for training. In each round of training, the selected vehicle agents 130 determine their local training iterations based on hyperparameters, their computation resources and their local data sizes, and then train models for the determined number of iterations using their local datasets. Upon finishing local training, the learning agents upload the trained models to the learning server via RSUs.

Figure 2B:
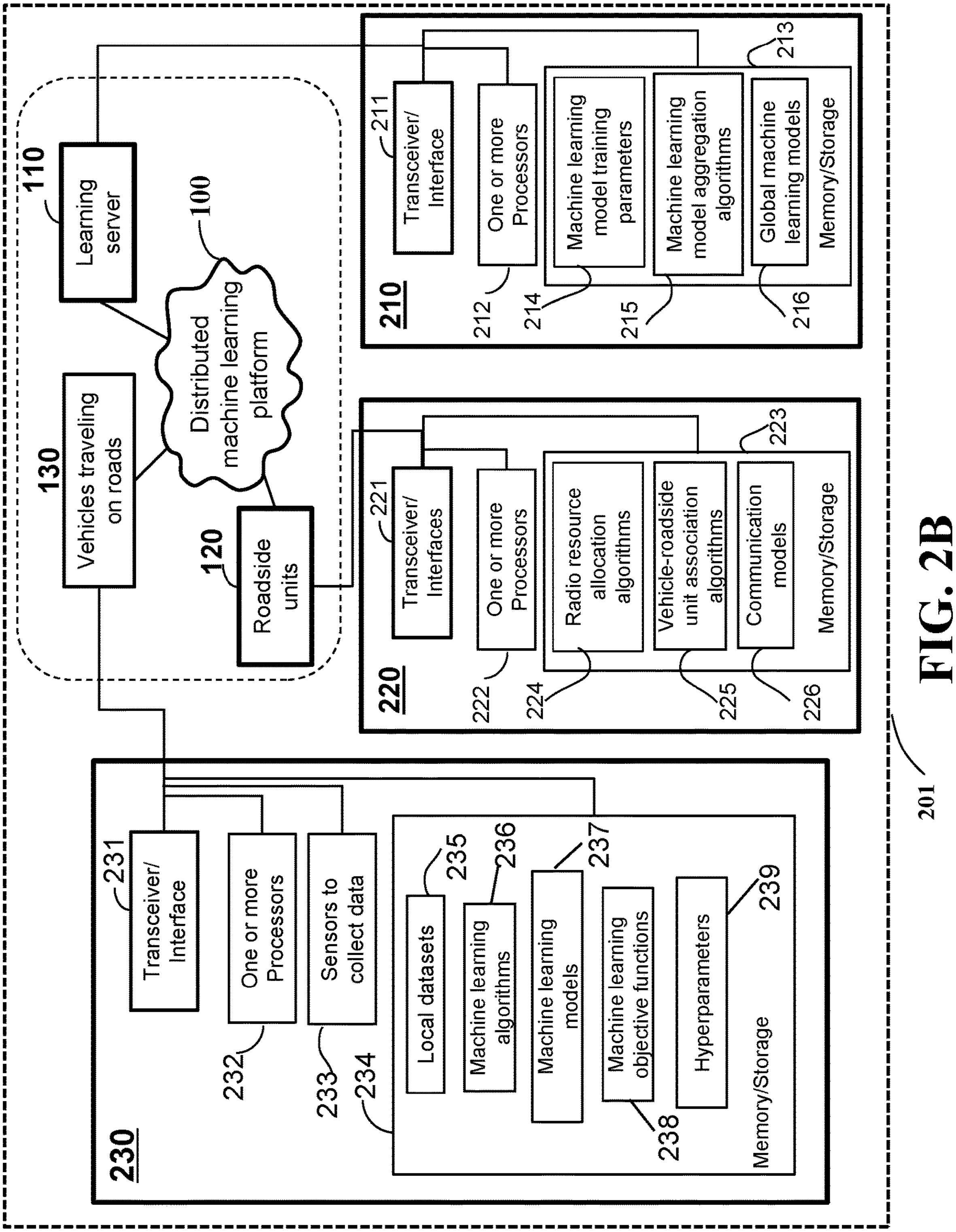
FIG. 2B shows an example of functional components of the learning server, roadside units and vehicle agent in the distributed machine learning platform, according to embodiments of the present invention.

FIG. 2B shows an example of federated learning platform 201 including functional components 210, 220 and 230 of the learning server, roadside units and vehicle agents, respectively, in a distributed machine learning platform 100. The learning server 110 may include an interface (or transceiver) 211 configured to communicate with the learning agents 130 via the RSUs 120, one or more processors 212, and a memory/storage 213 configured to store hyperparameters 214, model aggregation algorithm 215 and global machine learning model 216. A RSU 120 may include two interfaces (or transceivers) 221 configured to communicate with the learning server 110 via high speed reliable links and with vehicles 130 via wireless links, one or more processors 222, and a memory/storage 223 configured to store radio resource allocation algorithm 224, vehicle-RSU association algorithms 225, and communication algorithms 226. A vehicle 130 may include an interface (or transceiver) 231 configured to communicate with the learning server 110 via RSUs 120 via wireless links, one or more processors 232, sensors 233, and a memory/storage 234 configured to store local datasets 235, machine learning algorithms 236, machine learning models 237, machine learning objective functions 238, and hyperparameters 239.

Vehicle agents can complete model training based on different criteria including (1) time specified by learning server, (2) a pre-determined number of local training iteration, (3) local model training error reaching a pre-determined threshold and (4) stabilized local model training error.

A machine learning model can be expressed in different ways, e.g., using a set of model parameters x. For neural network based machine learning, the model parameters can be represented by a set of neural network weights as $x=(x_1, x_2, \ldots, x_k)$ Centralized Learning, Conventional Federated Learning and Issues Assume a network consists of one central server and n distributed clients. Denote the dataset possessed by the i-th client as $S_i$, the local dataset often differs across clients, the global dataset S:

$$S := \bigcup_{i=1}^{n} S_i$$

is defined as the sum of all datasets available to the centralized learning algorithm. The centralized learning aims to find a set of model parameters x that minimizes the loss function or objective function l(x,S) for all clients.

$$\underset{x}{\operatorname{argmin}}\, l(x, S). \tag{1}$$

The centralized optimization problem (1) requires all local datasets to be uploaded to the central server, which has two key issues: 1) requiring enormous communication bandwidth to upload data and 2) risking data privacy. Therefore, it is not practical.

Accordingly, federated learning (FL) was introduced as a communication-efficient and privacy-preserving framework to solve optimization problem (1) in a distributed fashion. In the decentralized framework, each of the local clients optimizes loss function over their own local version of the variable, while the central server seeks to find consensus among all clients, the equivalent decentralized version of problem (1) can be written as a $$\underset{x_1, \ldots x_n}{\arg\min} \sum_{i=1}^{n} l(x_i, S_i), \tag{2}$$
$$\textit{subjectto: } x_i = x_j, \textit{ forall } i, j.$$

One round of FL is executed as follows. The global model parameters of previous round $$x_{global}^{(t-1)} = \left(x_1^{(t-1)}, x_2^{(t-1)}, \ldots, x_k^{(t-1)}\right)$$

is delivered from the server to all clients, and each client tries to find a local optimizer of the algorithm $$x_i^{(t)} = \left(x_{i,1}^{(t-1)}, x_{i,2}^{(t-1)}, \ldots, x_{i,k}^{(t-1)}\right) = \operatorname{argmin}_{x_i} l(x_i, S_i)$$

using the global model parameters $$x_{global}^{(t-1)}$$

as a starting point. In order to reduce communication cost, it is common for FL clients to perform multiple optimization steps using the local objective as an approximation of the global objective. After local computation is completed, the server collects updated model parameters from clients and aggregate the collected model parameters to obtain round t global model parameters $$x_{global}^{(t)}.$$

In the round t, the server selects a subset $C_t$ of $n_t$ clients to participate in model training. The server aggregation often takes the form of weighted average over a simplex $p=(p_1, \ldots, p_{n_t})$ such that $$i.x_{global}^{(t)} = \sum_{i \in C_t} p_i x_i^{(t)}. \tag{3}$$

The algorithm then proceeds to next round. It can be seen that the determination of $p_i$ becomes the key in FL model aggregation.

The learning server can apply different methods to select vehicle agents including (1) randomly selecting vehicle agents, (2) selecting vehicle agents being connected to the network longer than a predetermined time period, (3) selecting vehicles having better link quality to their associated RSUs, (4) selecting vehicles having better performance in previous training round, (5) selecting vehicles having larger datasets, (6) selecting vehicles based on computation resources and (7) selecting vehicles based on distance to the collected RSUs.

Figure 3:
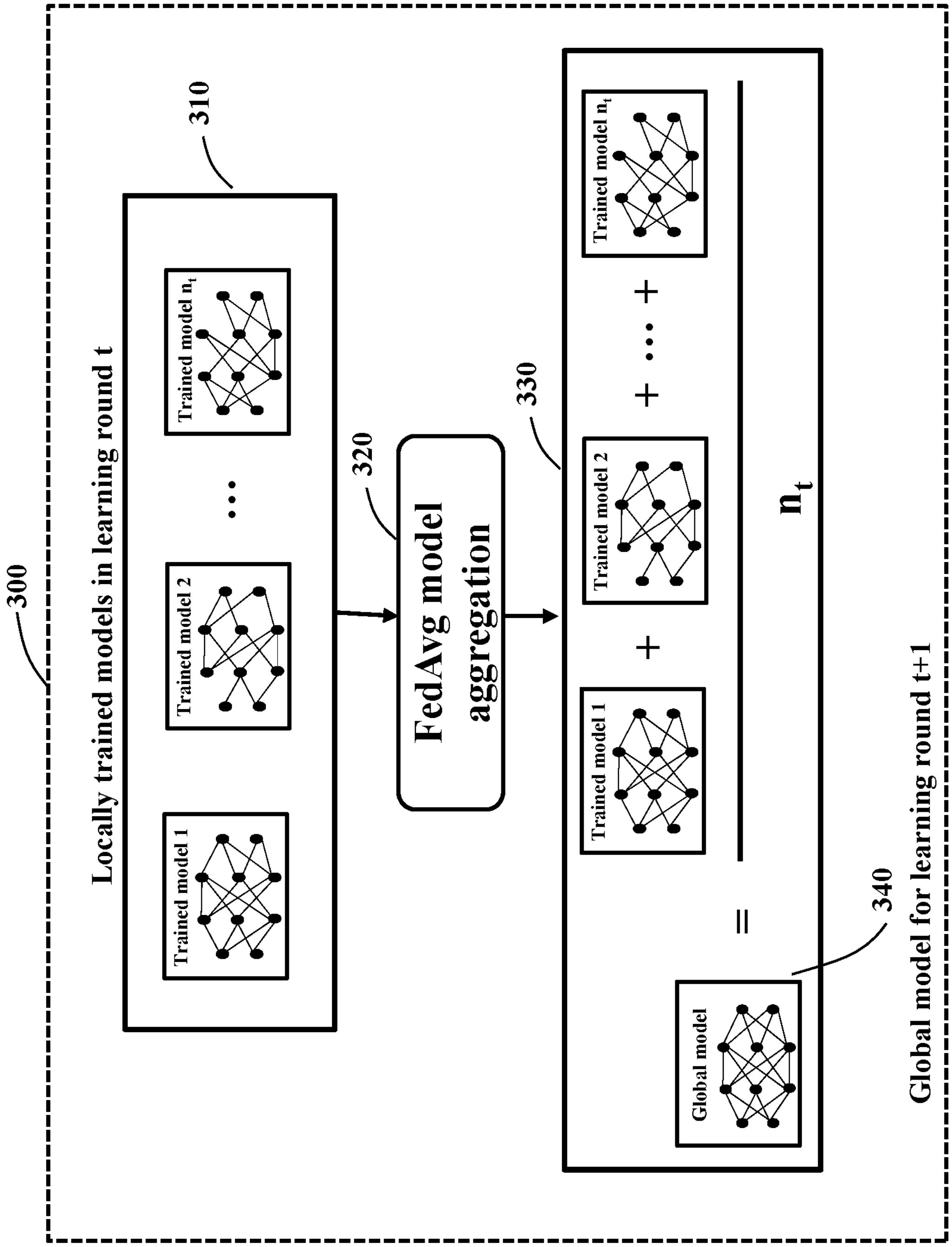
FIG. 3 shows the model aggregation approach in the conventional federated learning methods, according to some embodiments of the present invention.

The federated learning is executed by two major complements, learning server and learning agents. One of key functions performed by learning server is to aggregate the locally trained machine learning models by learning agents. However, the earlier FedAvg algorithm uses simple model average aggregation, i.e., simply averages the local model. FIG. 3 illustrates the FedAvg model aggregation 300, at round t, locally trained models 310 are uploaded to the central server, which applies FedAvg model aggregation 320 parameters by taking aggregation weights as $$p_i = \frac{1}{n_t}$$

(i=1, 2, . . . , $n_t$) 330 to obtain round t+1 global model 340. This aggregation method does not consider characteristics of dataset at all and therefore, does not take data heterogeity into account.

As a result, a data size based model aggregation method has been proposed in SCAFFOLD algorithm to take dataset size into account by setting aggregation weights as $$p_i = \frac{|S_i|}{\Sigma_{i\in\{n\}}|S_i|}$$

(i=1, 2, . . . , $n_t$). When the clients participating in the FL are homogeneous, i.e., the datasets $S_i$ follow the same distribution for all i, the data size based aggregation weights yield optimal results in terms of excess risk. However, when datasets $S_i$ (i=1, 2, . . . , $n_t$) don't follow the same distribution, the data size based aggregation weights don't give optimal results either. Take two datasets as an example, assume dataset 1 contains more data samples collected at middle night and dataset 2 contains less data samples collected at morning rush hour. To train a morning rush hour traffic model, dataset 2 is clearly more important than dataset 1. However, the data size based model aggregation gives more weight to dataset 1, which does not give appropriate aggregation weights.

Accordingly, a new model aggregation method is needed for FL to find optimal aggregation weights over heterogeneous datasets.

Variance-Based Federated Learning Model Aggregation

Since FL algorithm, especially those using momentum-based solvers such as Adam, are difficult to analyze directly. The problem can be simplified by considering the problem of finding the mean of a Gaussian random vector using data from clients. Assume that the total number of clients is n, the local dataset for client i is denoted as $S_i$ with the number of data points in each local client denoted as $|S_i|$. Denote the individual data as $$Z_{i,j} \in S_i \sim \mathcal{N}(\mu, \sigma_i^2 I_d),$$

where μ is the expectation of the distribution and can be assumed to be the same across all clients, while the parameter $\sigma_i$ is the standard deviation and the variance of the distribution is $$\sigma_i^2.$$

The objective for the learning server is to run an FL algorithm to find the best estimation of u.

When the data distribution on clients are heterogeneous, finding the optimal aggregation weights is a challenge. Assume that for client i, the distribution $D_i$ of dataset $|S_i|$ satisfies the following condition $$\mathbb{E}_{S_i\sim\mathcal{D}_i}[\nabla l(x, S_i)] = \mathbb{E}_{S_j\sim\mathcal{D}_j}[\nabla l(x, S_j)], \forall\, i \text{ and } j, \quad \text{and } \mathrm{Var}_{S_i\sim\mathcal{D}_i}(\nabla l(x, S_i)) = \sigma_i^2 I_d. \tag{4}$$

Assumption (4) assumes that the gradient evaluated at different clients i share the same expectation, yet the variance of the gradient varies across agents. This assumption is especially common in vehicular data, since the traffic dynamics on the road typically stays the same for all vehicles, yet the data captured by different vehicles tend to be different, therefore causing different variances in data.

The objective seeks to minimize the squared error $l(x,S) := \mathbb{E}\ z\in S\|x-Z\|^2$, where the estimated mean is denoted by x. The global estimation is calculated by the p-average methods given by simplex $p=(p_1, \ldots, p_n)$. Denote x as the global estimation $x_{global}=\Sigma_{i=1,\ldots,n} p_i x_i$, hence the optimal solution of the problem is given by $$x_{global} = \sum_{i=1}^{n} p_i \frac{\sum_{j=1}^{N_i} Z_{i,j}}{N_i}. \tag{5}$$

In this case, the algorithmic stability can be calculated by bounding generalization error defined as the difference between ground truth and federated learning prediction.

Theorem 1 For a task that satisfy Assumption (4) where the estimated mean is calculated by (5), the generalization error gen(μ, $x_{global}|\{S_i\}$) is minimized when the weight simplex $p=(p_1, \ldots, p_n)$ takes the following value $$p_i = \frac{\frac{N_i}{\sigma_i^2}}{\Sigma_{j=1}^{n}\frac{N_j}{\sigma_j^2}}. \tag{6}$$

The theorem states that in order to minimize generalization error, the optimal aggregation weight is proportional to the local dataset size and inversely proportional to the variance of the local dataset.

Figure 4:
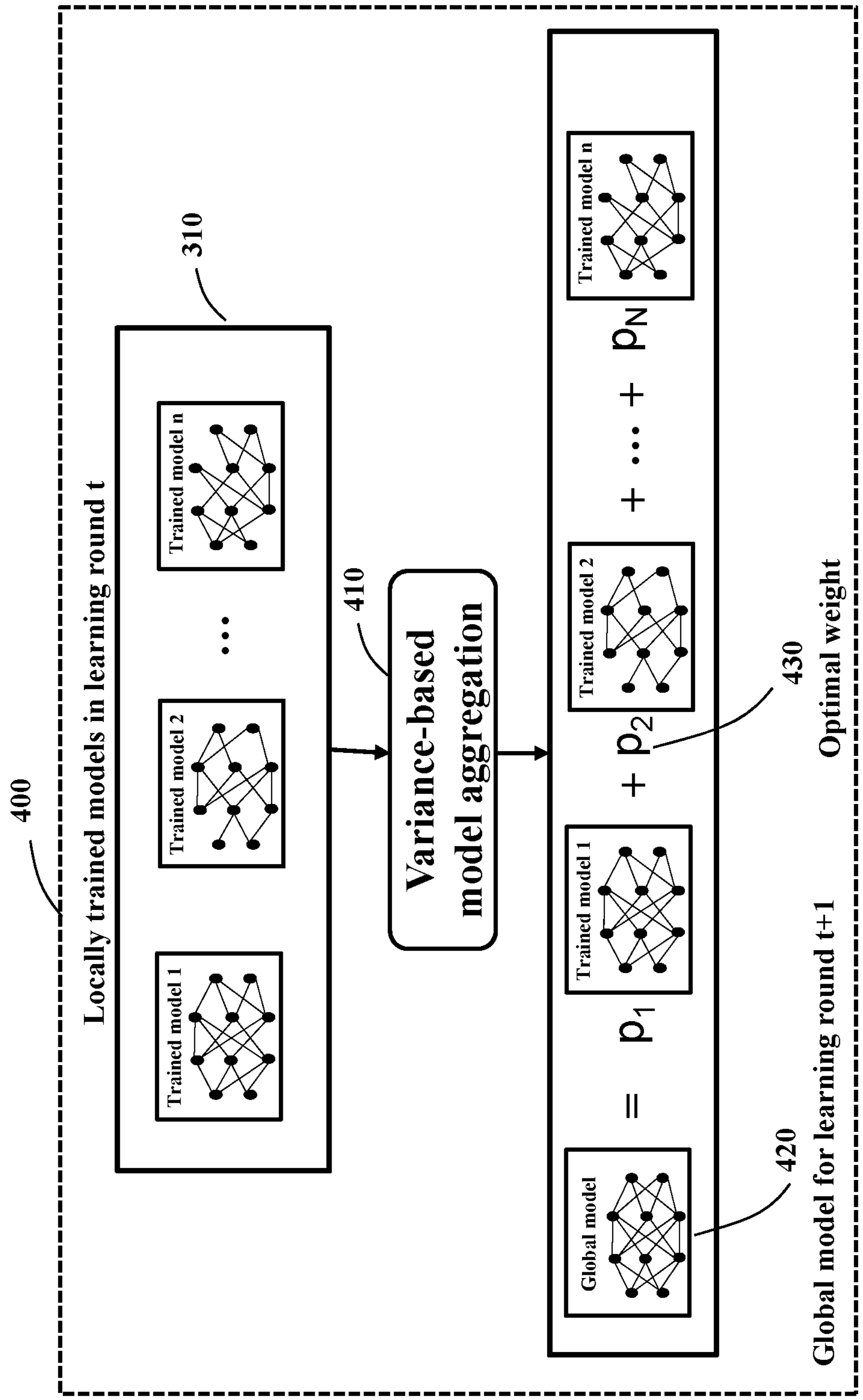
FIG. 4 depicts the model aggregation approach for vehicular federated learning provided by the present invention, according to some embodiments of the present invention.

Using optimal aggregation weights given by equation (6), the variance-based model aggregation method 400 is illustrated in FIG. 4, where the models 310 at round t are used by variance-based model aggregation 410 to obtain round t+1 global model 420, in which variance-based aggregation weights 430 calculated according equation (6).

The result also follows intuition, a dataset with less variance in its data distribution appears more stable, and can be relatively more trusted, in this case the dataset will have a heavier aggregation weight.

For the case of Gaussian variables with given variance, Theorem 1 ensures the best-case aggregation weight that ensures best possible algorithmic stability. In the sense of FL algorithms, the analysis becomes much more difficult. Motivated by the theoretical justification of Theorem 1, an estimation of the variance in dataset can be found.

Early FL works often uses gradient descent on local clients. Recently motivated by the success of momentum and adaptive optimizers in centralized machine learning, FL algorithms have also adapted similar methods in either server-side or client-side updates or even both sides. The present invention uses the Adam optimizer as an example to explain the variance estimation.

For the Adam optimizer, the variance of gradient can be calculated as follows. The k-th iteration of Adam is calculated as follows, $$g^{(k)} = \nabla_x l\left(x^{(k)}\right) \tag{7}$$
$$m^{(k)} = \left(\beta_1 m^{(k-1)} + (1-\beta_1)g^{(k)}\right)/\left(1-\beta_1^k\right)$$
$$v^{(k)} = \left(\beta_2 v^{(k-1)} + (1-\beta_2)\left(g^{(k)}\right)^2\right)/\left(1-\beta_2^k\right)$$
$$x_i^{(k+1)} = x^{(k)} - \alpha m^{(k)}/\left(\sqrt{v^{(k)}} + \epsilon\right)$$

where a denotes the stepsize, $\beta_1$, $\beta_2$ denotes the exponential decay rates for moment estimates and e is a term in Adam used to increase the stability of the algorithm. Consider term $m_t$ as the first moment of gradient $g_t$, the variance of gradient can be estimated as $$\mathrm{Var}[g_t] = \|g_t - m_t\|_2^2. \tag{8}$$

Using (8) as the estimation of gradient variance. A variance-based FL model aggregation algorithm is provided in FIG. 7, which aggregates FL models using optimal aggregation weights.

Structure-Aware Federated Learning Model Update at Client Side

Variance-based model aggregation allows the FL server to increase algorithmic stability of the training process. However, FL is a collaborative learning process by learning server and learning clients. To train robust machine learning model, it is desirable to provide client side model update scheme for heterogeneous clients.

In order to tackle the heterogeneity, namely device heterogeneity and statistical heterogeneity, and to increase the learning stability, FedProx and Scaffold model update methods have been proposed to serve as modification of the vanilla FedAvg update. However, these algorithms treat all model parameters as heterogeneous. The extensive empirical experiments show that for homogeneous parameter, these algorithms in fact exhibit worse performance when compared to vanilla FedAvg. In addition, FedProx uses simple model aggregation method and Scallfold applies the data size based model aggregation. In other words, these algorithms don't use optimal model agreegation weights.

Accordingly, it is desirable to provide a new model update method that treats model parameters differently, i.e., to classify the homogenous and heterogeneous model parameters in FL process. Considering the structure of ML model, different layers of a complex model often serve different purposes, take Convolutional Neural Networks (CNNs) in computer vision tasks for instance, it is commonly believed that the lower layers of a CNN serves as a common feature detector which can be kept invariant across different tasks, and the last layers are used to learn specific tasks. For the vehicular federated learning, the road network is same for all vehicles and traffic flow is also same for vehicles on same road. However, the vehicle trajectories, the sensors used to collected data, vehicle computation resource, travelling destinations and driver behaviors are different.

To perform the structure-aware model update (structure-aware model training method), a three-module structure is adopted in federated learning with three interacting modules each with unique purposes. Firstly, a graph encoder module encodes map and vehicles nearby the learning vehicle as a directed graph, then a policy header module learns a discrete policy for each vehicle in consideration, the sampled path is decoded into predicted trajectories of learning vehicle by a trajectory decoder module.

In order to maximize the advantages and minimize the disadvantages in heterogeneous FL, a client-side structure-aware FL model update method (structure-aware model training method) is provided as shown in FIG. 8. At the start of the FL process, the model parameters are classified into either homogeneous set $\mathcal{S}_{Hom}$ or heterogeneous set $\mathcal{S}_{Het}$, after each communication round, each client performs homogeneous model update on set $\mathcal{S}_{Hom}$ using FedAvg algorithm and heterogeneous model update on set $\mathcal{S}_{Het}$ using heterogenous FL algorithm such as FedProx or Scaffold algorithm.

Figure 5:
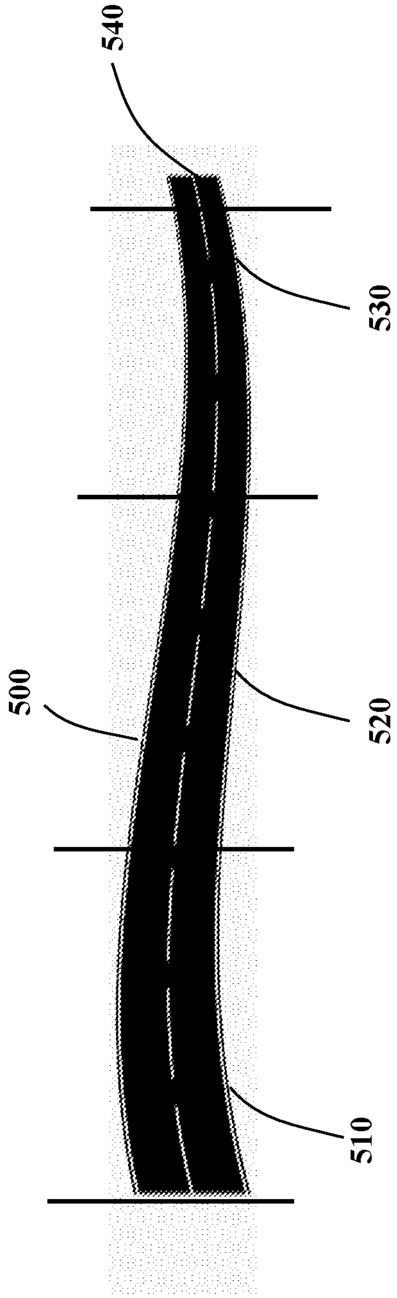
FIG. 5 shows an example of road sectioning method that divides a road into different sections, according to some embodiments of the present invention.

To classify model parameters, the parameters including road map and traffic flow are classified into set $\mathcal{S}_{Hom}$. The roads are segmented into sections as shown in FIG. 5, where a road 500 is divided into three segments 510, 520 and 530. The lane centerline 540 captures both the direction of traffic flow and the legal routes that each driver can follow. A road segment is represented as (x, y, θ, I) with x, y are the location, θ is the yaw and I is a 2-D binary vector indicating whether the segment lies on a stop line or crosswalk. Thus, the segment representation captures both the geometry as well as traffic control elements along lane centerlines. The traffic flow is represented as number of vehicles on a road segment. The parameters including vehicle trajectories, vehicle destinations and proximal vehicles are classified into set $\mathcal{S}_{Het}$, where the trajectory is represented (x, y, l, v, a, w, I) with x, y are the location co-ordinates, l is the lane number, v, a, w are the velocity, acceleration and yaw rate, and I is an indicator with value 1 for pedestrians and 0 for a vehicles.

Figure 6:
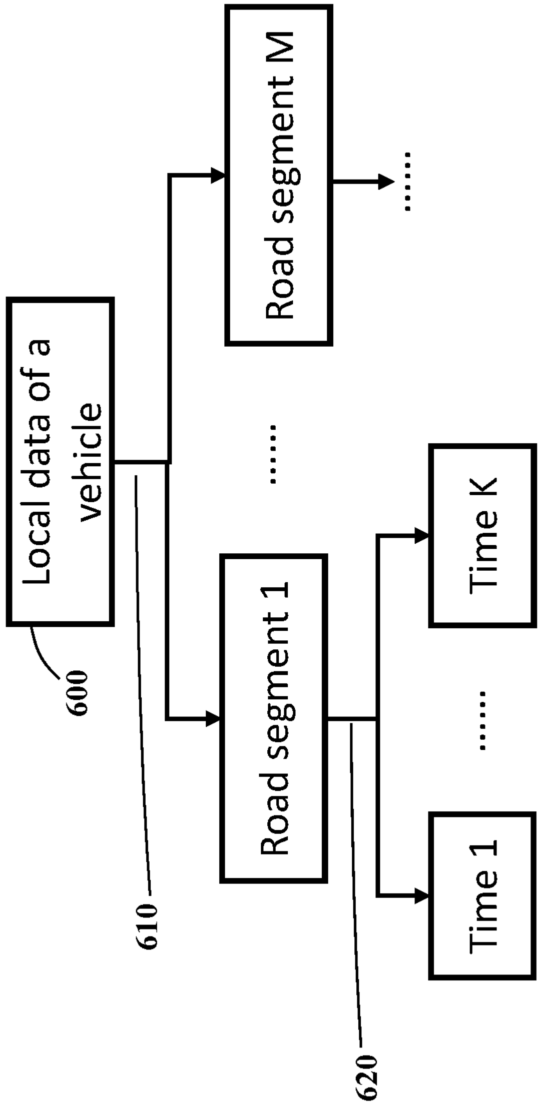
FIG. 6 shows an example of road-section based data clustering method that divides data at an on-road vehicle agent into clusters, according to some embodiments of the present invention.

To facilitate the deferated learning in the Internet of Vehicles, the training data of the learning clients can be partitioned into different clusters such that each cluster corresponds to a learning model, e.g., rush hour data are used to train the rush hour model. Data clustering is important for many reasons, e.g., off hour data is not desirable to train rush hour traffic model, local traffic data is not suitable to train freeway traffic model. There are different ways to cluster data. FIG. 6 illustrates a data clustering method used to divide data at each on-road vehicle into clusters, where local data 600 of a vehicle is first divided 610 based on road segments, and then divided further 620 based on time.

Figure 9:
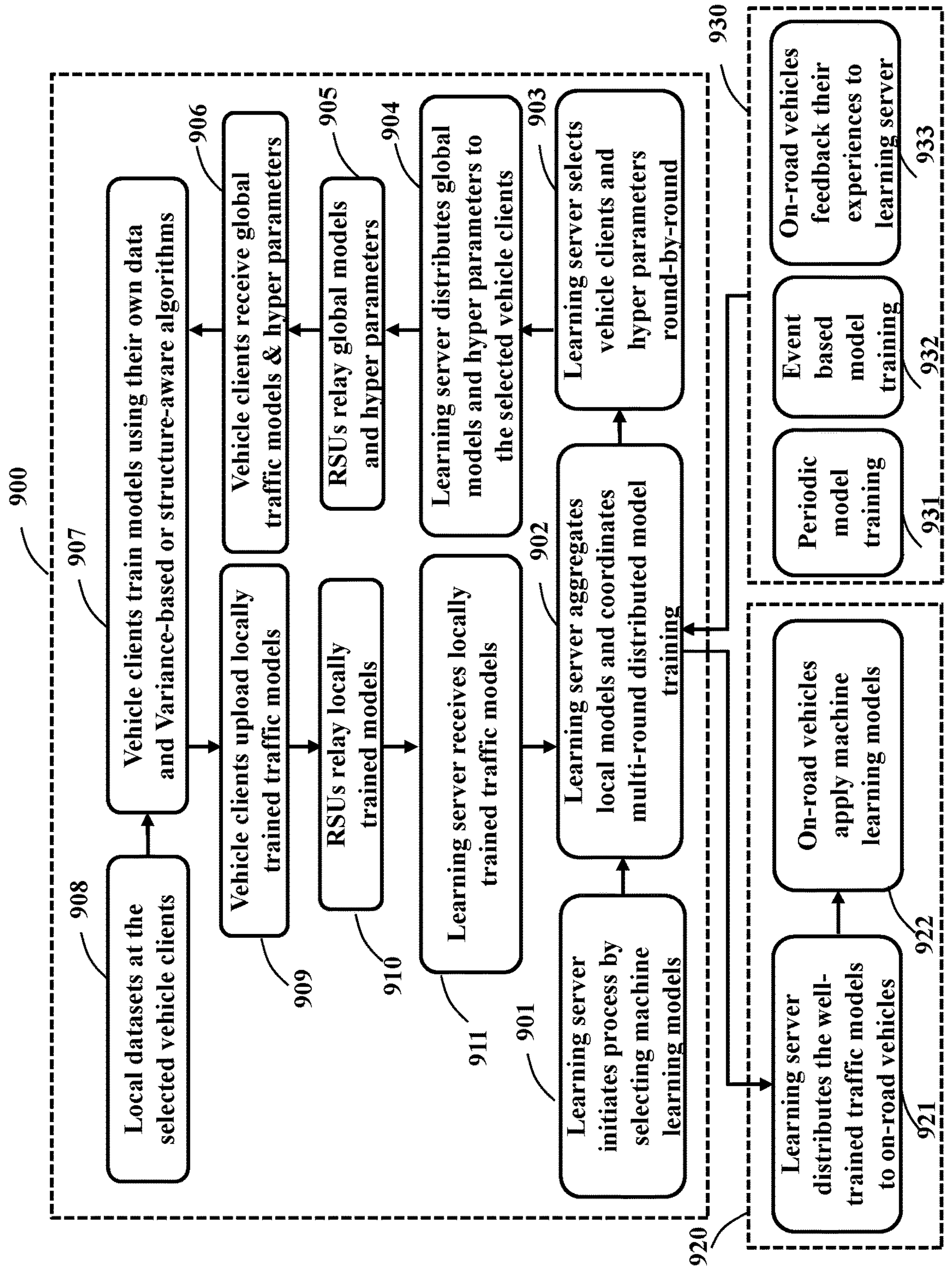
FIG. 9 illustrate functional blocks the federated learning model training phase and application phase, according to some embodiments of the present invention.

FIG. 9 shows functional blocks the federated learning training phase and application phase, according to some embodiments of the present invention, where block 900 shows the model training process and block 920 illustrates the model application process. For the model training, the learning server initiates the learning process 901 by selecting the machine learning models. The learning server then coordinates multi-round distributed model training 902. To do so, the learning server selects vehicle clients and model training hyperparameters 903. The learning server distributes global machine learning models and hyper parameters to the selected vehicle clients 904 via RSUs, which then relay models and hyperparameters to the selected vehicle clients 905. Upon receiving global models and hyperparameters 906, vehicle clients locally train machine learning models 907 using their local datasets 908 and variance-based or structure-aware federated learning algorithms provided in FIGS. 7 and 8. When local training is completed, vehicle clients upload locally trained models to the learning server 909 via RSUs, which relay the locally trained models to the learning server 910. Upon receiving the locally trained models 911, the learning server aggregates local models using variance-based model aggregation shown in FIG. 4 and coordinates next round of training 902.

Once the machine learning models are well-trained, the learning server distributes models 921 to all on-road vehicles, which use the trained models to make their multi-horizon predictions 922. The on-road vehicles then apply their predictions to their vehicle operations. In addition, the on-road vehicles can feedback their experiences to the learning server for model enhancement.

The federated learning process can be initiated in different ways 930, e.g., 1) Periodic model training 931: where the learning server initiates periodic model training every day or every week or every other time period, 2) Event based model training 932: where the learning server learns information from city management department about a big construction or a big sports event and 3) Feedback based model training 933: where on-road vehicles identify the difference between model prediction and ground truth observed.

We claim:

1. A learning server for training a global machine learning model using vehicle agents via roadside units (RSUs) in a network, comprising:

at least one processor; and a memory having instructions of a vehicular federated learning method stored thereon that cause the at least one processor to perform:

selecting the vehicle agents from on-road vehicles driving on roads associated with a road map with respect to the global machine learning model;

distributing the global machine learning model to the selected vehicle agents via the RSUs, wherein the RSUs are associated respectively with the vehicle agents, wherein the vehicle agents include on-board computer units and on-board sensors configured to collect local data while the vehicle agents drive on current trajectories of the roads, wherein the selected vehicle agents locally train the global machine learning model using the on-board computer units and the collected local data via a structure-aware model training method, wherein the locally trained models are stored as trained local models, wherein the structure-aware model training method comprises classifying a set of global model parameters of the global machine learning model into at least a homogeneous parameter subset comprising parameters that model environmental characteristics that are common across the vehicle agents and a heterogeneous parameter subset comprising parameters that model vehicle-specific characteristics that differ among the vehicle agents, wherein the homogeneous parameter subset and the heterogeneous parameter subset are updated within a same training round according to different parameter update strategies;

aggregating the trained local models from the selected vehicle agents via a variance-based model aggregation method; and updating the global machine learning model using the aggregated trained local models, wherein the at least one processor continues the selecting, the distributing, the aggregating and the updating until a global training round reaches a pre-determined number of multi-rounds or learning error stabilizes.

2. The learning server of claim 1, wherein the set of global model parameters $$x_{global}^{(t)}$$

at global training round t, is distributed to the selected vehicle agents for locally training the distributed global machine learning model using local datasets of the vehicle agents, wherein a locally trained model by a vehicle agent i is represented as $$x_i^{(t)}.$$

3. The learning server of claim 2, wherein the selection of the vehicle agents is based on one or combination of (1) randomly selecting vehicle agents, (2) selecting vehicle agents being connected to the network longer than a predetermined time period, (3) selecting vehicle agents having better link quality to the associated RSUs, (4) selecting vehicle agents having better performances in previous global training rounds, (5) selecting vehicle agents having larger datasets, (6) selecting vehicle agents based on computation resources and (7) selecting vehicle agents based on distances to the associated RSUs.

4. The learning server of claim 3, wherein the learning server distributes the set of global model parameters $$X_{global}^{(t)}$$

to the selected vehicle agents via the associated RSUs.

5. The learning server of claim 2, wherein at the global training round t, the learning server aggregates the local models $$x_i^{(t)}$$

using a weight simplex $p=(p_1, \ldots, p_n)$ as $$x_{global}^{(t)} = \sum_{i=1}^{n} p_i x_i^{(t)}$$

where n is a number of the selected vehicle agents.

6. The learning server of claim 5, wherein while aggregating the trained local models, the learning server applies a variance-based optimal weight simplex p $p=(p_1, \ldots, p_n)$ computed according to $$p_i = \frac{\frac{N_i}{\sigma_i^2}}{\sum_{j=1}^{n} \frac{N_j}{\sigma_j^2}}, (i = 1,2, \ldots, n)$$

where n is a number of the selected vehicle agents, $N_i$ is a number of data samples of vehicle agent i and $$\sigma_i^2$$

is the variance of vehicle agent i, $N_j$ is a number of data samples of vehicle agent j, and $\sigma_j^2$ is the variance of the local dataset of vehicle agent j.

7. The learning server of claim 1, wherein the set of global model parameters in homogeneous parameter subset are updated using homogeneous federated learning algorithms and the set of global model parameters in heterogeneous parameter subset are updated using heterogeneous federated learning algorithms.

8. The learning server of claim 1, wherein the structure-aware model training method uses a combination of graph encoder module, a policy header module, and a trajectory decoder module, wherein the graph encoder module is configured to encode the road map, each of the vehicle agents, and proximal vehicles into a directed graph, wherein the policy header module is configured to learn a discrete policy for each of the vehicle agents and the proximal vehicles, and wherein the trajectory decoder module is configured to predict trajectories of one of the vehicle agents by decoding sampled paths of the vehicle agent.

9. The learning server of claim 1, wherein the selected vehicle agents upload the trained local models to the learning server via the RSUs, wherein the selected vehicle agents upload the trained local models to currently connected RSUs, wherein the RSUs relay the received trained local models to the learning server.

10. The learning server of claim 9, wherein the selected vehicle agents upload the trained local models to the learning server based on one or combination of criteria (1) time specified by the learning server, (2) a predetermined number of local training iterations, (3) local model training error reaching a predetermined threshold and (4) local model training error stabilizing.

11. The learning server of claim 1, wherein the selected vehicle agents partition local datasets into different clusters such that each cluster is used to train a particular machine learning model, wherein the local data collected at different locations and at different time are used to train the corresponding particular learning models.

12. The learning server of claim 1, wherein at least two of the selected vehicle agents collect the local data using different types of two sensors respectively equipped on the least two of the selected vehicle agents.

13. The learning server of claim 12, wherein the two sensors are a high-end GPS and a low-end GPS receiver, wherein the high-end GPS receiver provides more accurate measurements than that of the low-end GPS receiver.

14. The learning server of claim 1, wherein the global machine learning model is trained by using neural networks with adaptive momentum optimizers.

15. The learning server of claim 1, wherein training of the global machine learning model is initiated by one or combination of 1) periodic model training, 2) event based model training and 3) feedback based model training.

16. The learning server of claim 1, wherein the learning server distributes well-trained global machine learning models to all on-road vehicles, wherein the on-road vehicles apply the well-trained global machine learning models to respective tasks of the on-road vehicles such as trajectory prediction, velocity prediction, energy consumption prediction and parameter calibration of an advanced driver-assistance system (ADAS) or an autonomous driving (AD) system.

17. A computer-implemented method for training a global machine learning model using a learning server and vehicle agents via roadside units (RSUs) in a network, comprising:

selecting vehicle agents from on-road vehicles driving on roads associated with a road map with respect to the global machine learning model;

distributing the global machine learning model to the selected vehicle agents via the RSUs, wherein the vehicle agents include on-board computer units and onboard sensors configured to collect local data while the vehicle agents drive on current trajectories of the roads, wherein the selected vehicle agents locally train the global machine learning model using the on-board computer units and the collected local data via a structure-aware model training method, wherein the locally trained models are stored as trained local models, wherein the structure-aware model training method comprises classifying a set of global model parameters of the global machine learning model into at least a homogeneous parameter subset comprising parameters that model environmental characteristics that are common across the vehicle agents and a heterogeneous parameter subset comprising parameters that model vehicle-specific characteristics that differ among the vehicle agents, wherein the homogeneous parameter subset and the heterogeneous parameter subset are updated within a same training round according to different parameter update strategies;

aggregating the trained local models from the selected vehicle agents via a variance-based model aggregation method; and updating the global machine learning model using the aggregated trained local models, wherein at least one processor continues the selecting, the distributing, the aggregating and the updating until a global training round reaches a pre-determined number of multi-rounds or learning error stabilizes.

18. The computer-implemented method of claim 17, wherein at a global training round t, the learning server aggregates trained local models $$x_i^{(t)}$$

using a weight simplex $p=(p_1, \ldots, p_n)$ as $$x_{global}^{(t)} = \sum_{i=1}^{n} p_i x_i^{(t)},$$

where n is a number of the selected vehicle agents.

19. The computer-implemented method of claim 18, wherein while aggregating the trained local models, the learning server applies a variance-based optimal weight simplex $p=(p_1, \ldots, p_n)$ computed according to $$p_i = \frac{\frac{N_i}{\sigma_i^2}}{\sum_{j=1}^{n} \frac{N_j}{\sigma_j^2}}, (i = 1,2, \ldots , n)$$

where n is a number of the selected vehicle agents, $N_i$ is a number of data samples of vehicle agent i and $$\sigma_i^2$$

is the variance of vehicle agent i, $N_j$ is a number of data samples of vehicle agent j, and $$\sigma_j^2$$

is the variance of the local dataset of vehicle agent.

* * * * *